(12) United States Patent
Gardner

(10) Patent No.: US 7,097,906 B2
(45) Date of Patent: Aug. 29, 2006

(54) PURE CARBON ISOTROPIC ALLOY OF ALLOTROPIC FORMS OF CARBON INCLUDING SINGLE-WALLED CARBON NANOTUBES AND DIAMOND-LIKE CARBON

(75) Inventor: Slade H. Gardner, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 387 days.

(21) Appl. No.: 10/455,495

(22) Filed: Jun. 5, 2003

(65) Prior Publication Data

US 2004/0247515 A1    Dec. 9, 2004

(51) Int. Cl.
*B32B 9/00* (2006.01)
(52) U.S. Cl. .................. 428/408; 428/367; 423/447.1; 252/502; 977/DIG. 1
(58) Field of Classification Search ................ 252/502; 423/445 B, 447.3; 977/DIG. 1; 428/408
See application file for complete search history.

(56) References Cited

U.S. PATENT DOCUMENTS

| | | | |
|---|---|---|---|
| 5,269,953 A | 12/1993 | Whewell | 252/30 |
| 5,500,200 A | 3/1996 | Mandeville et al. | 423/447.3 |
| 6,251,522 B1 | 6/2001 | Tanaka et al. | 428/408 |
| 6,375,917 B1 | 4/2002 | Mandeville et al. | 423/447.3 |
| 6,422,450 B1 | 7/2002 | Zhou et al. | 228/121.85 |
| 6,423,288 B1 | 7/2002 | Mandeville et al. | 423/447.3 |
| 6,451,175 B1 | 9/2002 | Lal | 204/173 |
| 6,495,116 B1 | 12/2002 | Herman | 423/447.3 |
| 2001/0001654 A1 | 5/2001 | Yudasaka et al. | 423/445 |
| 2001/0019238 A1 | 9/2001 | Dai et al. | 313/309 |
| 2001/0050219 A1 | 12/2001 | Anazawa et al. | 204/173 |
| 2002/0018745 A1 | 2/2002 | Herman | 423/447.1 |
| 2002/0085968 A1 | 7/2002 | Smalley et al. | 422/198 |
| 2002/0102353 A1 | 8/2002 | Mauthner et al. | 427/255.28 |
| 2002/0127170 A1 | 9/2002 | Hong et al. | 423/447.3 |
| 2003/0012722 A1 | 1/2003 | Liu | 423/447.1 |

OTHER PUBLICATIONS

Author Unknown, "Exploring Carbon Nanotubes," 2002, Oak Ridge National Laboratory REVIEW, vol. 35, No. 3, p. 18.*

* cited by examiner

*Primary Examiner*—Colleen P. Cooke
*Assistant Examiner*—Rebecca M. Stadler
(74) *Attorney, Agent, or Firm*—Bracewell & Giuliani LLP

(57) ABSTRACT

An isotropic carbon alloy is formed from various carbon allotropes such as SWCNT, fullerenes, MWCNT, diamond-like carbon, diamond, nanocrystalline diamond, diamondoids, amorphous carbon, graphitic polyhedral crystals, graphite, graphene, HOPG, and hydrogenated amorphous carbon. The SWCNTs are present in different morphologies such as ropes, bundles, single filaments, tangled webs, etc. The SWCNT have large aspect ratios and weave throughout the alloy. Many morphologies of ICA are possible with a range of properties attainable as a function of the composition of carbon allotropes and post-processing techniques. Post-processing can be done to enhance particular properties of the ICA and may include HIP, furnace heating, ion beam irradiation, electron beam irradiation, laser irradiation, electric resistive heating, inductive heating, IR irradiation, etc. Contaminants may be present in the ICA as a consequence of the process equipment, process feedstock, or catalysts used in the reactors.

17 Claims, 2 Drawing Sheets

PURE CARBON ISOTROPIC ALLOY OF ALLOTROPIC FORMS OF CARBON INCLUDING SINGLE-WALLED CARBON NANOTUBES AND DIAMOND-LIKE CARBON

This patent application is related to U.S. patent application Ser. No. 10/455,767, and entitled, System, Method, and Apparatus for Continuous Synthesis of Single-Walled Carbon Nanotubes, which was filed concurrently herewith and is incorporated herein by reference.

BACKGROUND OF THE INVENTION

1. Technical Field

The present invention relates in general to an improved composition of matter and, in particular, to a novel composition of matter comprising a pure carbon isotropic alloy consisting of a plurality of allotropic forms of carbon.

2. Description of the Related Art

Elemental carbon has many different allotropic forms and applications. This wide variety of allotropic forms is attributable to carbon being the only element in the periodic table known to have isomers with 0, 1, 2, or 3 dimensions. The carbon atom can hybridize electronic states in several different valence bonds which allows for a variety of different atomic bonding configurations. The isomers can have sp, sp2, or sp3 hybridization in the valence electron orbitals. Some of the more common forms of carbon are graphite, charcoal, carbon fibers, and diamond. Many other allotropes of carbon exist, some of which have been discovered as recently as within the last 20 years.

In the 1980s, carbon fullerenes were discovered. These molecules are ellipsoidal shaped and typically contain 60 carbon atoms with near-planar sp2 hybridization. Each molecule resembles a soccer ball in configuration with a collection of pentagonal and hexagonal rings. Larger fullerenes with 70 or 84 carbon atoms do exist but are less common and more ellipsoidal in shape. Carbon fullerenes have been made using an arc-discharge method to generate carbon plasma and then a controlled deposition in a furnace.

Carbon nanotubes are another form of carbon allotrope which also have sp2 near-planar hybridization, but form high aspect ratio, hollow tubes. Carbon nanotubes can have a range of diameters of about 0.7 nm and larger. The mechanical properties of single tubes have very high strength, stiffness, and elongation making them one of the most impressive structural materials known. Carbon nanotubes have been made using several techniques such as arc-discharge and laser ablation to generate carbon plasma followed by a controlled catalytic deposition, sometimes done in a furnace. There are two main types of carbon nanotubes:

single-wall carbon nanotubes (SWCNT) and multi-wall carbon nanotubes (MWCNT). A SWCNT appears as a single filament of material and has superior mechanical behavior to the MWCNT type. A MWCNT is a collection of carbon nanotubes nested inside other carbon nanotubes to make a sheathed tube. The absence of chemical bonding between nested tubes results in slippage between layered tubes that does not allow translation of load to occur effectively in the radial direction of the tube. Furthermore, since a MWCNT is larger in diameter than a SWCNT, the aspect ratio is smaller resulting in larger cross sectional area and lower specific strength. Different morphologies of SWCNT have been demonstrated. Some of these morphologies are tangled webs, aligned filaments, bundles, ropes, and crystals.

Polycrystalline Diamond is a carbon allotrope that has sp3 hybridization and a continuous 3-dimensional structure of carbon atoms. Diamond is one of the hardest materials known. Due to the potential applications for this material, techniques for vapor phase deposition of diamond have been developed and advanced. Recent developments have led to the formation of nanocrystalline diamond as a domain of diamond material in a second phase of graphitic carbon. Diamondoids have recently been discovered, which are very small crystals of diamond, 4–11 crystal cages of carbon in size. Diamondoids are essentially small particles of diamond that have been identified as possible building blocks for nano-structured materials.

Diamond-like carbon (dlc) is a broad class of amorphous materials having sp2 and sp3-hybridized carbon and hydrogen. The physical and chemical properties of dlc are between diamond and graphite. The most notable feature of dlc is high hardness. Techniques for vapor phase deposition of dlc have been advanced recently.

Amorphous carbon describes a disordered, three-dimensional material with random sp2 and sp3 hybridization. Amorphous graphite is similar but consists mostly of sp2 hybridization having random stacking of graphitic layer segments. Hydrogenated amorphous carbon is a dlc with a significant fraction of sp3 hybridization.

While graphite is a commonly known form of carbon, there are many types of graphite with a wide range of properties and applications. Graphite is a layered, planar form of carbon bonded in a hexagonal array with sp2 hybridization. The different types of graphite typically describe the degree of order of the planar layers, the flatness of the planar layers, and the distance between the planar layers. Amorphous graphite has been described above and has little order and a relatively large interlaminar spacing. When this material has curved and twisted planar layers it is called tubostratic graphite. Highly Oriented Pyrolytic Graphite (HOPG) is a synthetic material with nearly perfect planar structure that is very ordered with a minimum interlaminar spacing. The term graphene describes a single sheet of graphite, so order is not significant and layer spacing is large enough that it is essentially irrelevant. A graphene platelet is a single small layer of material. Graphitic polyhedral crystals have been reported which resemble a very large MWCNT with a high degree of order and small interlaminar spacing, but the layers are not strictly flat. The graphite layers wrap consistently around a polyhedral core to form a crystal shaped structure. Graphite whiskers, also called vapor grown carbon fibers, have a tree ring concentric cylinder morphology which is similar to the polyhedral graphitic crystals, but are formed about around a circular core to make a fibrous shape.

Often carbon and graphite are used as reinforcement in a composite system. A composite is a combination of two or more different materials that form a single material. Composites typically are hard, strong, or stiff fibers or particles which serve as reinforcement to a softer, more compliant material. An alloy is traditionally used to describe blends of different metals to make a material with designed properties. Similarly, in polymer science, an alloy is a blend of different polymers which is designed to have desirable properties. In both of these definitions of an alloy, two or more similar materials are mixed together in solid solution to form a single material. Therefore, a combination of different carbon allotropes is not a composite, but is strictly an alloy material. Although these prior art types of materials are useful, it would be even more desirable to have a composition of matter comprising a pure carbon isotropic alloy having properties that exceed those of prior art alloys.

SUMMARY OF THE INVENTION

In one embodiment of the present invention, a novel composition of matter made of various forms of carbon to form an isotropic carbon alloy (ICA) is disclosed. The main component of the alloy is SWCNT and the remaining components are various carbon allotropes such as: fullerenes, MWCNT, diamond-like carbon, diamond, nanocrystalline diamond, diamondoids, amorphous carbon, graphitic polyhedral crystals, graphite, graphene, HOPG and hydrogenated amorphous carbon. Although SWCNT is the main component in the alloy, it may not make up the majority of the composition. It is, however, the most important constituent for the structural performance of the alloy. The ICA is an alloy of several forms of carbon. In this alloy, SWCNTs are present in different morphologies such as ropes, bundles, single filaments, tangled webs, etc. The SWCNT have large aspect ratios and weave throughout the alloy. Voids are kept to a minimum but are impossible to prevent entirely. On the nanometer scale, there are areas of local orientation where SWCNT and MWCNT are aligned together. However, on a larger length scale, the alloy appears isotropic in nature due to the random orientation of the entire alloy.

The ICA is made by deposition of carbon. The deposition can happen in a single step or a multi-step process. The single step process can make use of a suitable reactor with a single reactant stream using PVD, CVD, Plasma reaction, sputtering techniques, particle spray, plasma spray, etc. A multi-step process can be used where a first layer is deposited using a suitable reactor to deposit a layer of one form of carbon, followed by deposition of a different layer using another suitable reactor. This multi-step process does not need to be limited to two different depositions, and can include a multitude of different layers and reactors. The multi-step process is repeated until build up of structure is complete.

Many morphologies of ICA are possible with a range of properties attainable as a function of the composition of carbon allotropes and post-processing techniques. Post-processing can be done to enhance particular properties of the ICA. Post-processing techniques include HIP, furnace heating, ion beam irradiation, electron beam irradiation, laser irradiation, electric resistive heating, inductive heating, IR irradiation, etc. Contaminants may be present in the ICA as a consequence of the process equipment, process feedstock, or catalysts used in the reactors. These contaminants are recognized as unavoidable and do not add to the structural performance of the alloy. Contaminants may be beneficial in that they fill areas or inclusions to occupy space that may otherwise become a void area. Contaminants may include oxides, metals, nitrides, nitrites, halides, organics, carboxyls, cyanides, carbonyls, etc.

The foregoing and other objects and advantages of the present invention will be apparent to those skilled in the art, in view of the following detailed description of the preferred embodiment of the present invention, taken in conjunction with the appended claims and the accompanying drawings

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF AN ILLUSTRATIVE EMBODIMENT

Figure 1:
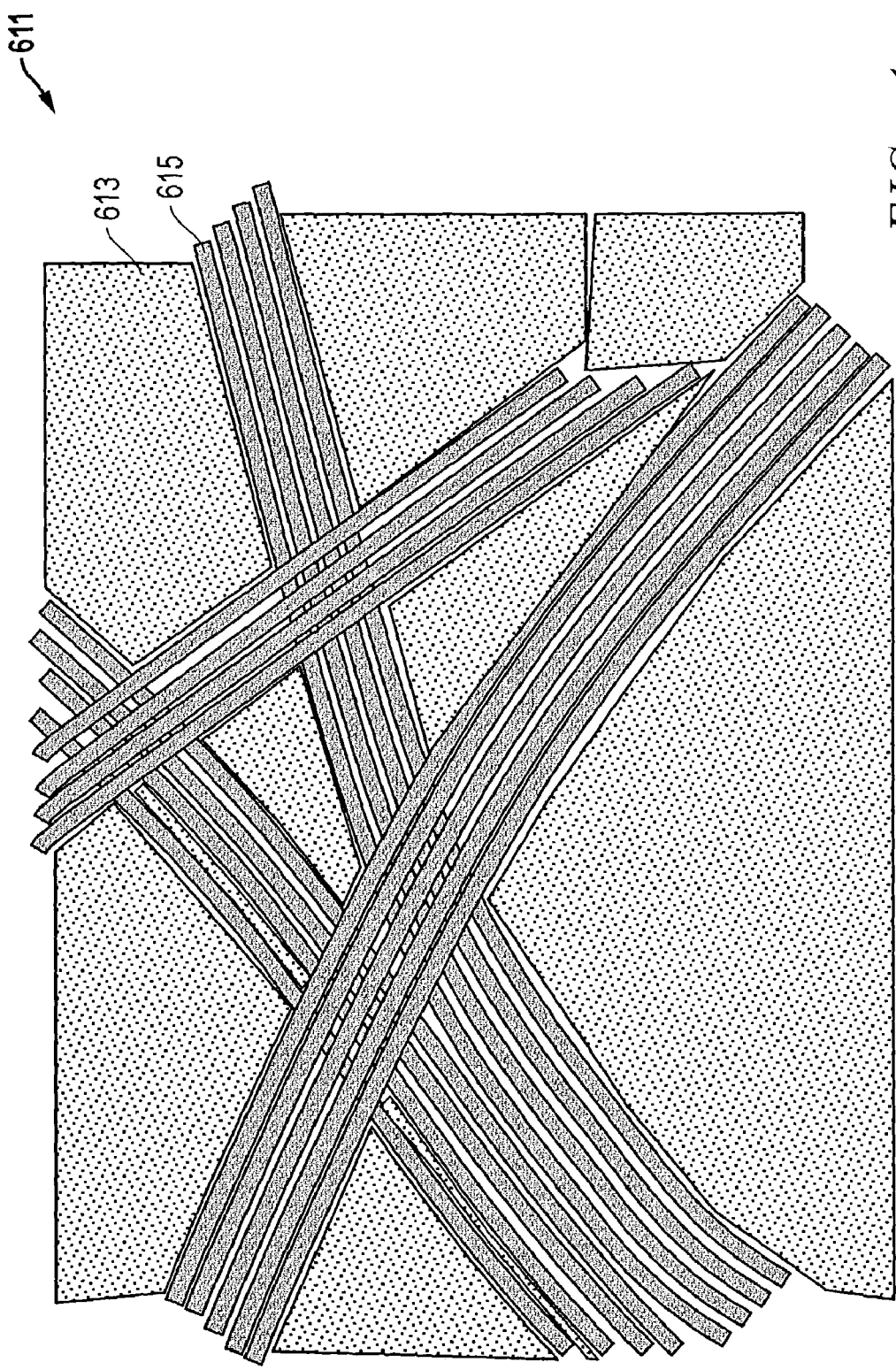
FIG. 1 is a schematic diagram of one embodiment of a composition of matter constructed in accordance with the present invention.
Figure 2:
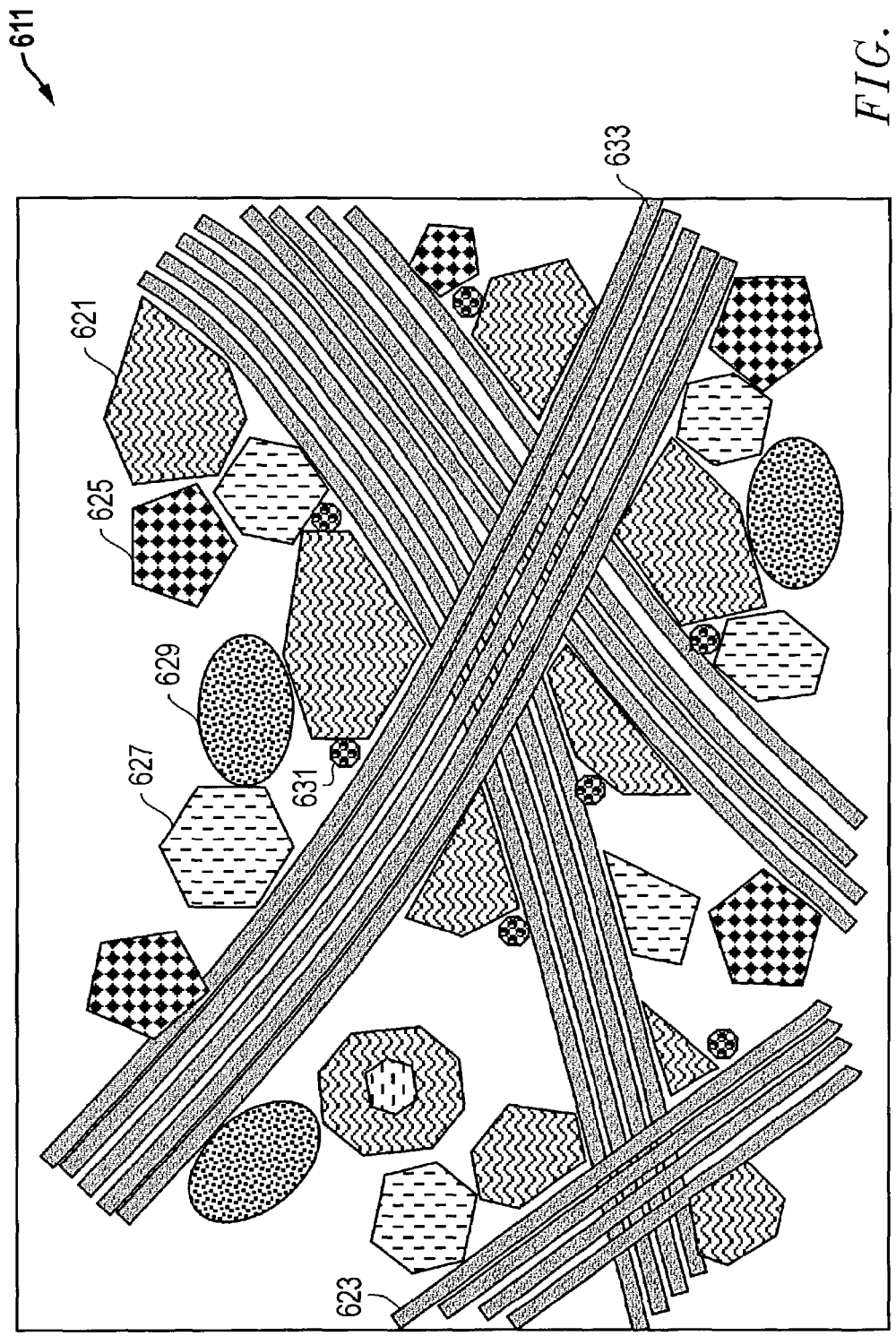
FIG. 2 is a schematic diagram of another embodiment of a composition of matter constructed in accordance with the present invention.

Referring to FIGS. 1 and 2, schematic diagrams of two embodiments of the present invention is depicted. The present invention is a novel composition of matter, which comprises a pure carbon isotropic alloy 611 having a plurality of allotropic forms of carbon 613, 615 (FIG. 1). For example, as shown in FIG. 2, the pure carbon isotropic alloy 611 may comprise a matrix of diamond-like carbon 621, multi-walled carbon nanotubes (MWCNT) 623, fullerenes 625, graphite 627, graphene 629, and amorphous carbon 631, and a reinforcement for the matrix comprising single-walled carbon nanotubes (SWCNT) 633. In one embodiment of the present invention, the pure carbon isotropic alloy comprises approximately 10% to 60% of the single-walled carbon nanotubes, and approximately 40% of the diamond-like carbon.

The diamond-like carbon may comprise approximately 30% to 70% of the pure carbon isotropic alloy. In one version, the fullerenes comprise both C60 and C70 molecules and, more particularly, the fullerenes comprise approximately 90% of the C60 molecules, and approximately 10% of the C70 molecules. The pure carbon isotropic alloy of the present invention has a tensile modulus of approximately 55 Msi, a tensile strength of approximately 1500 ksi, and a density of 1.4 g/cc.

The present invention has several advantages and comprises a novel composition of matter made of various forms of carbon to form an isotropic carbon alloy (ICA). This novel composition of matter is isotropic, in that it has properties, such as density, electrical conductivity, electric permittivity, magnetic permeability, or refractive index that do not vary with distance or direction. The material also has magnetic, electrical, or electromagnetic properties that do not vary with the direction of static or propagating magnetic, electrical, or electromagnetic fields within the material.

This alloy composition primarily comprises SWCNT, but also includes various other carbon allotropes such as: fullerenes, MWCNT, diamond-like carbon, diamond, nanocrystalline diamond, diamondoids, amorphous carbon, graphitic polyhedral crystals, graphite, graphene, HOPG and hydrogenated amorphous carbon. Although SWCNT is the main component in the alloy, it may not make up the majority of the composition, but it is the most important constituent for structural performance. The SWCNTs are present in different morphologies such as ropes, bundles, single filaments, and tangled webs. The SWCNT have large aspect ratios and weave throughout the alloy. On the nanometer scale, there are areas of local orientation where the SWCNT and MWCNT are aligned together. However, on a larger length scale, the alloy is isotropic in nature due to the random orientation of the entire alloy.

The ICA is made by deposition of carbon. The deposition can happen in a single step or a multi-step process. The single step process can make use of a suitable reactor with a single reactant stream using, for example, PVD, CVD, plasma reaction, sputtering techniques, particle spray, or plasma spray. A multi-step process can be used where a first layer is deposited using a suitable reactor to deposit a layer of one form of carbon, followed by deposition of a different layer using another suitable reactor. This multi-step process does not need to be limited to two different depositions, and can include a multitude of different layers and reactors. The multi-step process is repeated until build up of structure is complete.

Many morphologies of ICA are possible with a range of properties attainable as a function of the composition of carbon allotropes and post-processing techniques. Post-processing can be done to enhance particular properties of the ICA. Post-processing techniques may include, for example, HIP, furnace heating, ion beam irradiation, electron beam irradiation, laser irradiation, electric resistive heating, inductive heating, or IR irradiation. Contaminants may be present in the ICA as a consequence of the process equipment, process feedstock, or catalysts used in the reactors. These contaminants are recognized as unavoidable and do not add to the structural performance of the alloy. Contaminants may be beneficial in that they fill areas or inclusions to occupy space that may otherwise become a void area. Contaminants may include, for example, oxides, metals, nitrides, nitriles, halides, organics, carboxyls, cyanides, or carbonyls.

In one embodiment of the present invention, the carbon alloy is formed by adding energy to the mixture. A temporary binder, such as a polymer, is initially used to bond the various allotropes of carbon and is subsequently burned off after the carbon alloy is isotropic and permanently bonded.

The novel composition of matter may be formed in a continuous manner by a system, method, and apparatus such as those described below. For example, the product may be formed by a three-step process of carbon plasma generation, plasma stabilization, and product spray deposition, all of which are scalable to large, industrial volume production levels. The plasma may be generated in several continuous manners, including electrical resistance heating and/or electron beam vaporization of feedstock, and catalytic pyrolysis of organic precursors. In the second step, the plasma is stabilized, for example, with radio frequency energy from inductance coils. In the final step, a transition metal catalyst and associated required catalyst support are used to form the end product of swcnt.

One advantage and application of this system is the continuous, large scale production is of single wall carbon nanotubes for manufacturing high performance structures. This method is superior to other processes because it provides for (i.) the continuous generation of carbon plasma, (ii.) stabilization of the carbon plasma for homogenization of the reactant mixture and transport of a high concentration of carbon plasma to the product formation zone, and (iii.) a continuous operation, flow-through reactor design. In addition, the entire apparatus is designed so that it can be mounted vertically, such that continuous deposition of product can be precisely applied to a structure using an overhead robotic arm.

The initiation of the carbon plasma may be accomplished by several methods. One option is vaporization of a resistively-heated graphite element to create a thermal plasma. Carbon or graphite feedstock, which are readily available from commercial suppliers as rod stock, fiber, or in a special-designed geometry, is continuously fed over two oppositely-charged electrodes. Low voltage, high current, electric power is then passed through the feedstock. This results in rapid resistance-heating of the feedstock. The electric power is regulated by feedback control from an ultra-high temperature pyrometer, which measures the element temperature in order to maintain a peak temperature of around 3000° C. The reactor is closed and sealed with a reduced pressure inert atmosphere of continuously-flowing inert gas. By controlling the feed rate of the feedstock, the pressure of the inert gas, and the electric power level, partial vaporization of the feedstock is controlled to a level such that the there is enough carbon remaining to allow a continuous line feed.

Another method for generating the carbon plasma is to vaporize the feedstock with an electron beam. This method uses an e-beam focused on, for example, a graphite feedstock to generate a carbon plasma. This design allows localized directional control of the energy and efficient energy transfer because of the highly conductive nature of the graphite.

Another method for generating the carbon plasma is catalytic pyrolysis of organic precursors. This is accomplished using a continuous feed of hydrocarbons in an inert gas stream through a heated zone or by passing through a plasma jet. The heated zone can be accomplished using a device like a tube furnace or a tungsten coil. The plasma jet can be accomplished using a cathode/anode plasma gun using a high voltage discharge to dissociate and ionize the hydrocarbon feedstock.

The second step in the process is plasma stabilization. Classical chemical engineering reactor design specifies that reactants should form a homogeneous mixture for optimization of product yield, purity, and reaction rate. The stabilization step has been completely ignored in the processes reported in the open literature to date. This stabilization step homogenizes the plasma energy density and concentration, leading to a more efficient reactor. The stabilization of the carbon plasma is achieved using inductively coupled radio frequency (rf) energy or microwave (mw) energy from a wave guide. The power and frequency are controlled such that the carbon plasma remains stable in the vapor phase. Electrical resistance heaters also can be added inside the reactor to maintain a chamber temperature of up to 1700° C. This additional thermal energy may be used to reduce the required rf or mw energy needed to stabilize the carbon plasma, and to also promote a higher concentration of carbon vapor in the reactor. Stabilization of the plasma occurs immediately downstream from the generated plasma.

The third and last stage of the reactor is the swcnt formation zone. One of the important elements of the formation zone is a transition metal catalyst and associated catalyst support. The formation zone may have variations of geometry and supporting equipment that will affect the rate and purity of the swcnt production. The formation zone is immediately downstream from the plasma stabilization zone. One of the simplest designs for the swcnt formation zone is to transport the stabilized plasma through a catalyst screen in the deposition nozzle. The catalyst screen can be made from a variety of materials, depending upon the operating temperature of the stabilization zone. Some of these materials include ceramic fiber mesh with a transition metallic catalyst coating, a metallic screen made directly from the transition metallic catalyst, a carbon fiber coated with a transition metallic catalyst, and/or a porous silica membrane with a transition metallic catalyst deposited on the "exit" side of the membrane. The flow rate, carbon concentration, pressure, and temperature should be carefully regulated. Differential pressure is used to push the swcnt product out the exit port.

Another method is to introduce the transition metal catalyst into the formation zone as a gas phase organometallic compound or as metal nanoparticles. In this manner, the formation of swcnt occurs in the flowing reactant stream and can be ejected for deposition on a surface. Yet another method is to coat a substrate with a transition metal catalyst and allow the formation zone to occur just on the outside of the reactor on the substrate.

While the invention has been shown or described in only some of its forms, it should be apparent to those skilled in the art that it is not so limited, but is susceptible to various changes without departing from the scope of the invention.

The invention claimed is:

1. A composition of matter, comprising:
    a pure carbon isotropic alloy having a plurality of allotropic forms of carbon, comprising single-walled carbon nanotubes and diamond-like carbon.

2. The composition of matter of claim 1, wherein the pure carbon isotropic alloy comprises approximately 10% to 60% of the single-walled carbon nanotubes.

3. The composition of matter of claim 1, wherein the pure carbon isotropic alloy comprises approximately 60% of the single-walled carbon nanotubes and approximately 40% of the diamond-like carbon.

4. The composition of matter of claim 1, wherein the diamond-like carbon comprises approximately 30% to 70% of the pure carbon isotropic alloy.

5. The composition of matter of claim 1, wherein the pure carbon isotropic alloy further comprises fullerenes.

6. The composition of matter of claim 5, wherein the fullerenes comprise both C60 and C70 molecules.

7. The composition of matter of claim 6, wherein the fullerenes comprise approximately 90% of the C60 molecules, and approximately 10% of the C70 molecules.

8. The composition of matter of claim 1, wherein the pure carbon isotropic alloy further comprises multi-walled carbon nanotubes.

9. The composition of matter of claim 1, wherein the pure carbon isotropic alloy further comprises graphite, graphene, and amorphous carbon.

10. The composition of matter of claim 1, wherein the pure carbon isotropic alloy has a tensile modulus of approximately 55 Msi, a tensile strength of approximately 1500 ksi, and a density of 1.4 g/cc.

11. A composition of matter, comprising:
    a pure carbon isotropic alloy having a plurality of allotropic forms of carbon, including a matrix of diamond-like carbon, multi-walled carbon nanotubes, fullerenes, graphite, graphene, and amorphous carbon, and a reinforcement for the matrix comprising single-walled carbon nanotubes.

12. The composition of matter of claim 11, wherein the pure carbon isotropic alloy comprises approximately 10% to 60% of the single-walled carbon nanotubes.

13. The composition of matter of claim 11, wherein the pure carbon isotropic alloy comprises approximately 40% of the diamond-like carbon.

14. The composition of matter of claim 11, wherein the diamond-like carbon comprises approximately 30% to 70% of the pure carbon isotropic alloy.

15. The composition of matter of claim 11, wherein the fullerenes comprise both C60 and C70 molecules.

16. The composition of matter of claim 15, wherein the fullerenes comprise approximately 90% of the C60 molecules, and approximately 10% of the C70 molecules.

17. The composition of matter of claim 11, wherein the pure carbon isotropic alloy has a tensile modulus of approximately 55 Msi, a tensile strength of approximately 1500 ksi, and a density of 1.4 g/cc.

* * * * *